United States Patent Office 3,608,434
Patented Sept. 28, 1971

3,608,434
DUAL AREA HYDRAULIC ACTUATOR
Benny M. Hillberry, West Lafayette, Ind., assignor to the United States of America as represented by the Secretary of the Army
Filed Jan. 13, 1970, Ser. No. 2,617
Int. Cl. F15b *11/16*
U.S. Cl. 91—411R    2 Claims

ABSTRACT OF THE DISCLOSURE

A plurality of fluid cylinders and pistons are connected to a source of fluid under pressure, and are cross-connected to one another through valving, such that the piston-cylinder arrangement is extended at a rapid rate of travel to push a force-exerting rod. When this rod meets a high resistance load a valve is shifted, automatically, to increase the force output while the piston-cylinder and rod advances at a reduced rate of travel.

BRIEF SUMMARY

Pressurized fluid is customarily supplied to an expandable chamber motor at a fairly constant rate and the motor output (piston movement, for example) is therefore substantially constant. However, the motor may operate under no load or very light load conditions for a considerable period of time before heavy load conditions are experienced. Then the heavily loaded motor must operate at a low rate of speed and exert increased force sufficient to do the intended job. The present invention teaches a solution to the problem. For convenience of illustration a simple hydraulic jack (cylinder and piston arrangement) is described. The apparatus automatically shifts from low pressure-high movement to high pressure-low movement characteristics. Many examples could be cited to show the need for such apparatus. As an example, a fluid jack, to lift an automobile, may be extended rapidly upwardly with ease until the load is contacted. Then the jack may be extended slowly upwardly with ease to lift the automobile. The principles involved could be used in forms of hydraulic or pneumatic apparatus other than that specifically set out hereinafter.

In the drawings:

The single figure diagrammatically illustrates the invention in a simple form, with side-by-side cylinders and pistons acting in unison.

Fixed base member 1 has hydraulic cylinders 2 and 3 attached thereto. Piston rods 4 and 5 are attached to movable crosshead 6. Valve body 7 is secured to crosshead 6 and has a piston valve member 8 slidably mounted therein. Springs 9 and 10 urge valve 8 toward the neutral or normal position, as shown in the drawing. Force-exerting rod 11 imparts force to an object to be moved.

Pressurized fluid is supplied through valve 12 to branch lines 13, 14 and 15. Return fluid flows through line 16. Line 17 connects cylinder 3 to valve body 7. Lines 13 and 17 should be flexible and extendable, or telescoping, or other to accommodate for lengthening and shortening thereof.

OPERATION

When valve 12 is in the position illustrated pressurized fluid in lines 14 and 15 (and the opposing forces from springs 9 and 10) is balanced, so that valve member 8 does not shift. Pressurized fluid in line 13 enters the lower end of cylinder 2. This forces piston rod 4, crosshead 6, rod 5, valve body 7 and rod 11 upwardly. Fluid may flow to the lower end of cylinder 3 through line 17. When rod 11 experiences substantial resistance piston valve member 8 is shifted downwardly compressing spring 9. Drain line 16 is shut off by valve 8. If the working fluid is a gas then the fluid trapped around spring 9 may escape slowly through an imperfect fit between valve 8 and valve body 7, or the gas may be compressed. If the fluid is a liquid it may escape around valve 8 as this piston valve is forced downwardly. After the valve is shifted, pressurized fluid flows from line 14 to line 17. Therefore the additional force of cylinder 3 is available automatically, for high-force applications.

Crosshead 6 and the piston-cylinder arrangement may be retracted by rotating two-way valve 12 clockwise 90 degrees to shut off pressurized fluid to lines 13, 14 and 15 thereby venting these lines to line 18. This permits gravity or spring 9 or both, to retract rods and crossheads 4, 5 and 6. Of course it would be possible to apply pressure to the top ends of cylinders 2 and 3 to assist in retracting the parts.

If desired cylinder 3 could be made much larger than cylinder 2, thereby increasing the force to three, or four, or more, times the force which cylinder 2 can deliver, without altering the pressurizing fluid pump, or any other part of the system. Also, the cylinders could be concentric, one inside of the other, as is well-known in the art.

I claim:

1. A multiple area fluid actuator comprising at least two expandable chamber motor devices operable to deliver a force for moving an object, a force-delivering element driven by said motor devices, fluid conduit means connected to a first of said motor devices to supply pressurized fluid thereto, fluid conduit means connected to a second of said motor devices to supply pressurized fluid thereto, valve means mechanically attached to said force-delivering element and blocking fluid passage in said second conduit means when said valve is in its normal neutral position, the mechanical attachment being such as to automatically open said valve means when said force-delivery element encounters a predetermined resistance to thereby automatically feed pressurized fluid to said second motor device.

2. Apparatus as in claim 1 wherein said valve means comprises a substantially cylindrical casing mounted on a plate connecting said motor devices, a spool valve in said casing, opposing resilient means urging said spool valve to its normal neutral position, said force-delivering element being connected to said spool valve to shift the valve when the force-delivering element encounters resistance.

References Cited
UNITED STATES PATENTS

| | | | |
|---|---|---|---|
| 446,799 | 2/1891 | Thorpe | 60—97H |
| 2,370,526 | 2/1945 | Doran | 60—53C |
| 2,984,985 | 5/1961 | MacMillin | 60—52HEX |

EDGAR W. GEOGHEGAN, Primary Examiner

U.S. Cl. X.R.
60—97H; 92—146

Sept. 28, 1971     B. M. HILLBERRY     3,608,434
DUAL AREA HYDRAULIC ACTUATOR
Filed Jan. 13, 1970
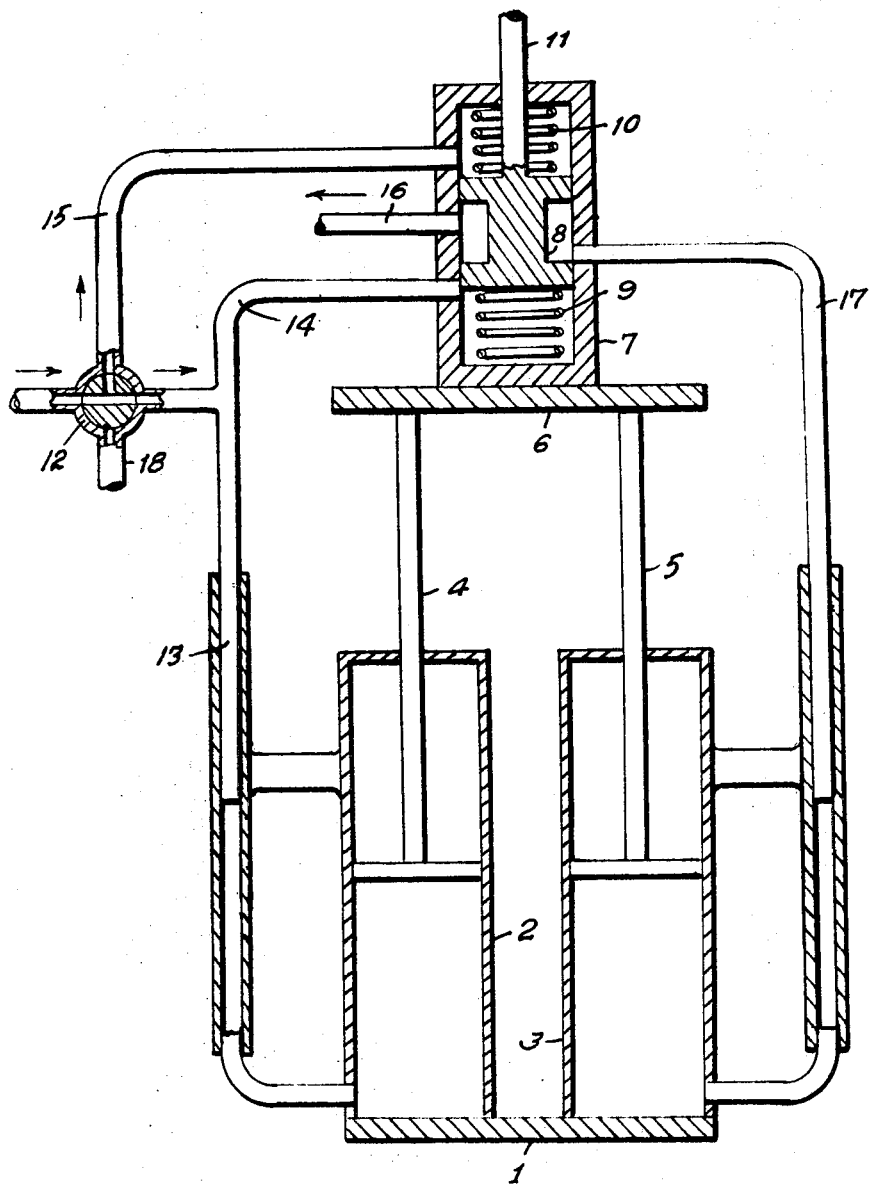
INVENTOR,
Benny M. Hillberry
BY: Harry M. Saragovitz,
Edward J. Kelly &
Herbert Berl